US006924911B1

(12) United States Patent
Ford et al.

(10) Patent No.: US 6,924,911 B1
(45) Date of Patent: Aug. 2, 2005

(54) METHOD AND SYSTEM FOR MULTI-SENSOR SIGNAL DETECTION

(75) Inventors: Gordon D. Ford, Round Rock, TX (US); Thomas A. Dundon, Austin, TX (US); Albert D. Edgar, Austin, TX (US); Martin Potucek, Austin, TX (US); Raymond S. Lee, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 838 days.

(21) Appl. No.: 09/686,336

(22) Filed: Oct. 11, 2000

Related U.S. Application Data
(60) Provisional application No. 60/159,073, filed on Oct. 12, 1999.

(51) Int. Cl.[7] ................................................. H04N 1/04
(52) U.S. Cl. ....................... 358/506; 358/505; 358/504; 358/475; 358/509
(58) Field of Search ................................ 358/506, 505, 358/504, 487, 475, 509, 496, 497

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,845,551 A | 7/1989 | Matsumoto | 358/80 |
| 4,933,566 A | 6/1990 | Masaaki et al. | 250/563 |

(Continued)

FOREIGN PATENT DOCUMENTS

| | | | |
|---|---|---|---|
| DE | 28 21 868 A1 | 11/1979 | G01N/21/32 |
| DE | 196 36 867 C1 | 1/1998 | H04N/5/21 |
| EP | 1 547 811 | 6/1979 | H04N/3/36 |
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |

(Continued)

OTHER PUBLICATIONS

*New Adaptive Vector Filter Based on Noise Estimate*, Mei Yu, et al., IEICE Trans Fundamentals, vol. E82, No. 6, Jun., 1999.
*A Robust Method for Parameter Estimation of Signal–Dependent Noise Models in Digital Images*, B. Aiazzi, et al., IEEE, 1997, pp. DSP 97—601–604.
*A Regularized Iterative Image Restoration Algorithm*, Aggelos K. Katsaggelos, et al., IEEE, 1991, pp. 914–929.

(Continued)

*Primary Examiner*—Kimberly Williams
*Assistant Examiner*—Negussie Worku
(74) *Attorney, Agent, or Firm*—Raymond M. Galasso

(57) ABSTRACT

A method and apparatus for defect detection through color-filter channels is provided. The present invention includes an electronic scanner or similar device having a multilinear imager, a computer, and software that implements all the color channels of the multilinear imager to collect IR information in order to detect defects on a physical medium. The present invention implements methods to increase IR gathering speed and/or increase the clarity of captured images on multilinear-imager devices. These improvements are accomplished by capturing infrared (IR) light through each color-filter channel such that image defects such as dust and scratches are removed. In one embodiment of the present invention, IR information is collected from each color channel at different scan positions in either a one-pass or a two-pass scanning system. In another embodiment of the present invention, each RGB color channel is used to collect both image and detect information at every scan line, again, either a one-pass or a two-pass scanning system.

21 Claims, 8 Drawing Sheets

U.S. PATENT DOCUMENTS

| | | | |
|---|---|---|---|
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |
| 6,442,301 B1 * | 8/2002 | Edgar | 382/275 |
| 6,493,061 B1 * | 12/2002 | Arita et al. | 355/41 |
| 6,552,778 B1 * | 4/2003 | Konagaya | 355/71 |
| 2003/0132384 A1 * | 7/2003 | Sugiyama et al. | 250/330 |

FOREIGN PATENT DOCUMENTS

| | | | | |
|---|---|---|---|---|
| EP | 0 569 142 A1 | 11/1993 | | H04N/5/253 |
| EP | 0 624 848 A2 | 11/1994 | | G06F/15/68 |
| EP | 0 669 753 A2 | 8/1995 | | H04N/1/407 |
| EP | 0 716 538 A2 | 6/1996 | | H04N/1/50 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |
| EP | 0 816 833 A3 | 8/1998 | | G01N/21/88 |
| EP | 0 893 914 A2 | 1/1999 | | H04N/5/253 |
| GB | 2 283 633 A | 5/1995 | | H04N/5/262 |
| JP | 4-291139 | 10/1992 | | G01N/21/89 |
| JP | 11185028 | 7/1999 | | G06T/1/00 |
| JP | 2000-13604 | 1/2000 | | H04N/1/409 |
| JP | 2000-196813 A | 7/2000 | | H04N/1/04 |
| WO | WO 84/02019 | 5/1984 | | G06F/15/20 |
| WO | WO 89/06890 | 7/1989 | | H04N/3/36 |
| WO | WO 90/01240 | 2/1990 | | H04N/1/40 |
| WO | WO 91/09493 | 6/1991 | | H04N/5/127 |
| WO | WO 92/05469 | 4/1992 | | G03B/27/53 |
| WO | WO 95/15530 | 6/1995 | | G06F/17/14 |
| WO | WO 97/16028 | 5/1997 | | H04N/7/30 |
| WO | WO 98/31142 | 7/1998 | | H04N/5/253 |
| WO | WO 98/34397 | 8/1998 | | |
| WO | WO 99/40729 | 8/1999 | | H04N/9/11 |
| WO | WO 01/48694 | 7/2001 | | G06T/5/00 |

OTHER PUBLICATIONS

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, Digital Color Management, Giorgianni, et al., Jan. 1998, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

| SCAN LINE | 1 | 2 | 3 | 4 | 5 | 6 | 7 | 8 | 9 | 10 |
|---|---|---|---|---|---|---|---|---|---|---|
| SCAN POSITION THAT RECORDS IR THROUGH BLUE CHANNEL | (1) | 2 | 3 | (4) | 5 | 6 | (7) | 8 | 9 | (10) |
| SCAN POSITION THAT RECORDS IR THROUGH GREEN CHANNEL | 5 | 6 | (7) | 8 | 9 | (10) | 11 | 12 | (13) | 14 |
| SCAN POSITION THAT RECORDS IR THROUGH RED CHANNEL | 9 | (10) | 11 | 12 | (13) | 14 | 15 | (16) | 17 | 18 |

FIG. 7

METHOD AND SYSTEM FOR MULTI-SENSOR SIGNAL DETECTION

This application claims benefit to U.S. Provisional Application 60/159,073 filed on Oct. 12, 1999.

TECHNICAL FIELD OF THE INVENTION

The present invention relates generally to imaging systems, and more particularly to a method and system for multi-sensor signal detection.

BACKGROUND OF THE INVENTION

Imaging systems, such as digital cameras, satellites, and image scanners, operate by converting electromagnetic energy from a source image to an electronic, i.e., digital, representation, of an image. The source image could be an actual view, such as a landscape, satellite image, and the like, or embodied in a physical form, such as a photograph, film, picture, document, and the like. In many applications, the electromagnetic energy used to convert the image into a digitized image is visible light, however, infrared, microwave, and other suitable types of electromagnetic energy are also be used to create the digitized image.

Imaging systems generally include a number of optic sensors. The sensors measure the intensity of electromagnetic energy within a specific bandwidth of the electromagnetic spectrum. Each sensor generally comprises a color filter and a photodetector, such as a charge-coupled device, phototransistor, photoresistor, and the like. The photodetector produces an electrical signal that is proportional to the intensity of electromagnetic energy striking the photodetector. The color filter blocks all wavelengths of light in the visible electromagnetic spectrum except a specific bandwidth. For example, in a red sensor a red filter blocks all other wavelengths of light in the visible spectrum except for the wavelengths of light associated with the color red. Accordingly, only the red bandwidth of light from the source image is measured by the red sensor.

The sensors are generally geometrically positioned in arrays such that the electromagnetic energy striking each sensor corresponds to a distinct location in the source image. Accordingly, each distinct location of the source image corresponds to a distinct location, or pixel, in the digitized image. In color applications, the electronic imager comprises an array of color optic sensors relating to one of the three primary colors—red, green, and blue. The intensity of red, green, and blue electromagnetic energy associated with each discrete location of the source image is measured and recorded.

In electronic scanner applications, the scanner records the color intensity for each color optic sensor in a sequence of scan positions until the entire image is scanned. The spacing between scan positions is referred to as the scan line pitch. The scan line pitch is generally the same as the pixel pitch, i.e., width of the line of detectors, but may vary depending on the desired image resolution. The color data relating to each pixel is then correlated to produce the digitized image.

The digitized image often includes imperfections that are not present in the source image. One cause of such defects is the optical components of the imaging system. For example, in the case of a electronic imagers, the scanning surface or "platen" in the electronic imager may contain scratches and other optical path obstructions. Dust, fingerprints, and other such debris also causes optical path obstructions. These optical path obstructions are digitized along with the real image and appear as imperfections in the digitized image.

Another cause of imperfections is defects within the physical medium of the source image. For example, a photograph, film, or other physical medium having an image thereon may be scratched, distressed, or deformed despite careful handling. In addition, imperfections may arise from foreign matter, such as a hair, dust, and the like being deposited on the physical medium while the image is digitized. Thus, even though an image is replicated exactly as contained in the physical medium, imperfections may still be present in the digitized image.

One method of removing imperfections from transparent physical mediums, such as film, is to transmit infrared (IR) light through the transparent medium to produce a defect image. Conventional electronic imagers use the red filtered photodetector or a dedicated infrared photodetector for detecting and measuring the infrared light. As a result, conventional electronic imagers require two complete scans of the source image. The first scan uses conventional light to create a color digitized image. The second scan uses infrared light to create a digitized defect image that is used to correct the defects in the digitized image. A disadvantage of conventional methods is that the infrared scan takes the same length of time to complete as the color scan. Accordingly, this method for defect correction doubles the duration of the scanning process.

SUMMARY OF THE INVENTION

Accordingly, a need has arisen for an improved imaging system. The present invention provides a method and system for multi-sensor signal detection that substantially reduces or eliminates problems associated with prior systems and methods.

In accordance with one embodiment of the present invention, an improved imaging system for digitizing an object is provided. In this embodiment, the imaging system comprises an optical sensor array, a visible light source, and an infrared light source. The optical sensor array includes at least multiple sets of color sensors that detect different colors of visible light. In addition, at least two sets of color sensors operate to measure the intensity of infrared light.

The present invention can be implemented with many different methods for employing the three color channels in a trilinear imager to collect the IR defect data. One such method collects IR information from each color channel at every third scan position of the image. This method also enables defect data to be collected at every scan line. In this manner the IR information gathering time is three times faster than in a system using only one color channel for gathering IR information. One-pass and two-pass scanning methods can be used in this embodiment of the present invention.

In another embodiment of the present invention, a method for simultaneously collecting IR information from each scan line using each color channel (red-green-blue) is disclosed. Because this embodiment collects IR information from all three color channels for each scan line, three times more defect information about the image is captured as opposed to using only one color channel. The additional information can be used to increase the clarity of the captured image because it improves the signal/noise ratio.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which:

FIG. 7 is a table illustrating scan positions that record IR information for different color channels for each scan line according to the present invention.

DETAILED DESCRIPTION OF THE INVENTION

FIGS. 1 through 8 illustrate an imaging system according to the present invention. As described in greater detail below, the imaging system allows an infrared defect scans to be performed at a faster rate than conventional systems. In particular, the present invention utilizes all of the color sensors in a tri-linear sensor system to obtain the infrared defect information.

Figure 1:
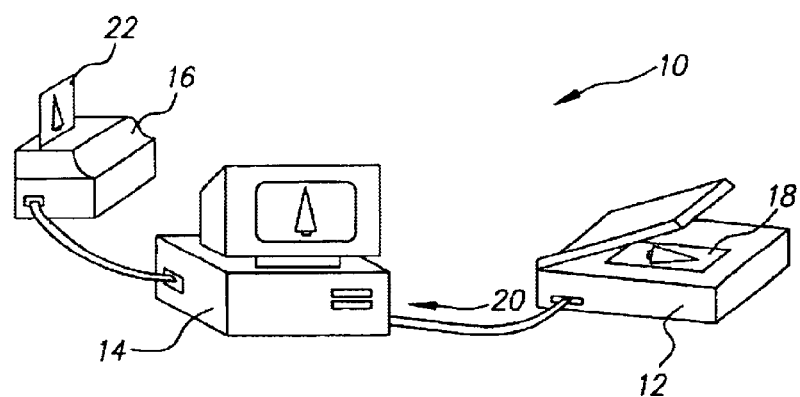
FIG. 1 is a perspective drawing illustrating a computer imaging system in accordance with the present invention.

FIG. 1 illustrates computer imaging system 10 in accordance with one embodiment of the present invention. The computer imaging system 10 comprises an electronic scanner 12, a computer system 14, and optional output device 16. Although the computer imaging system 10 is illustrated with separate and distinct components, it will be understood that the computer imaging system 10 can be integrated into a single system, such as a kiosk imaging center.

As described in greater detail below, the computer imaging system 10 operates to digitize a source image 18 to produce a digital image 20 that electronically represents the source image 18. The source image 18 may be a scene image, photograph, document, or any other suitable object that reflects or attenuates electromagnetic energy, i.e., light. The digital image 20 is output from the electronic scanner 12 to the computer system 14. The digital image 20 is generally in the form of an electronic data stream or an electronic file having four numeric values that correspond to each pixel in the digital image 20. The four numeric values describe the measured intensity of the red, green, blue, and infrared light for each discrete location of the source image 18. The infrared value allows defects to be corrected as shown in the U.S. patent application No. 08/999,421, entitled Defect Channel Nulling, having a priority date of Jan. 6, 1997; and U.S. Pat. No. 6,498,867 entitled Method and Apparatus for Differential-Illumination Image Capturing and Defect Handling, filed Oct. 8, 1999, each of which is hereby incorporated by reference.

The computer system 14 may be any suitable computer, such as a personal computer using a Pentium microprocessor; a workstation; server; mainframe embedded system; discrete logic, and the like. The computer system 14 generally includes memory and a graphical user interface that allows the digital image to be viewed, saved, edited, electronically mailed, combined with other digital images, or any other suitable use according to the needs of a user. An optional output device 16 may be coupled to the computer system 14. A typical output device 16 is a printer that allows a digital print image 22 to be produced.

Figure 2A:
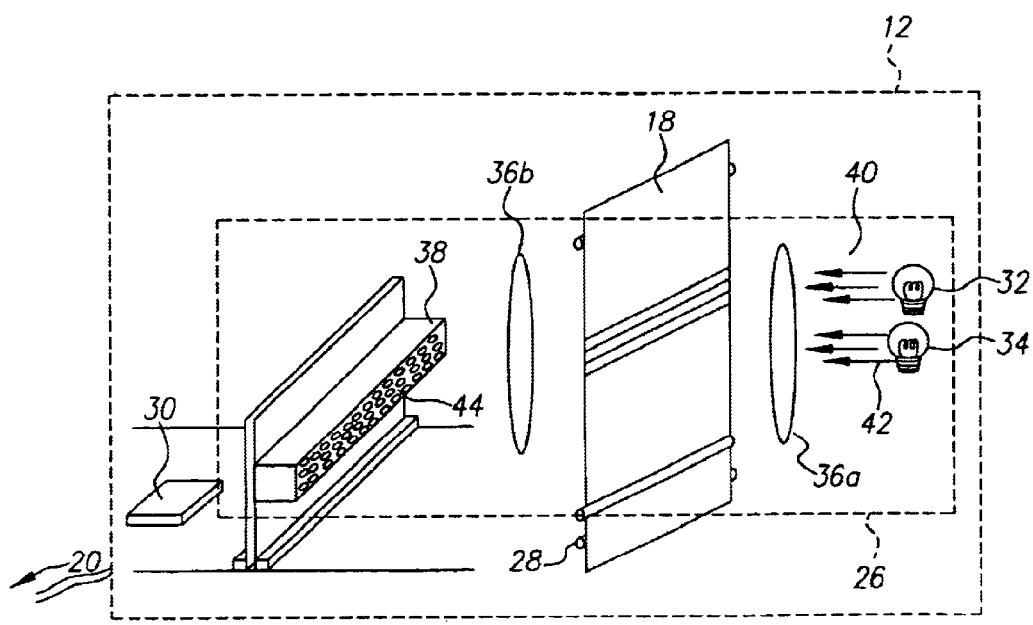
FIG. 2 is a perspective drawing illustrating an imaging system in accordance with the present invention.

FIG. 2A is a perspective drawing of the electronic scanner 12 shown in FIG. 1. The electronic scanner 12 is illustrated as an transmissive electronic scanner, such as a film, slide, or negative scanner. It will be understood, that the electronic scanner 12 may comprise any suitable color imaging device operable to digitize the source image 12. For example, the electronic scanner 12 may comprise a reflective electronic scanner, such as a flatbed scanner; a drum type scanner; a copy machine; and a facsimile.

In the embodiment illustrated, the electronic scanner 12 comprises an optical imager 26, a transport system 28, and a processor 30. As described in greater detail below, the optical imager 26 operates to illuminate the source image 18 with visible and infrared light and measure the intensity of visible colors and infrared for each discrete location of the source image 18.

The transport system 28 operates to move the source image 18 relative to the optical imager 26. Various embodiment of the transport system 28 may be implemented. For example, in one embodiment, the optical imager 26 is stationary and the source image 18 moves, or scans, across the optical imager 26. In another embodiment, the source image 18 is stationary and the optical imager 26 scans across the source image 18. In yet another embodiment, the source image 18 is stationary and the optical imager 26 is rastered across the source image 18.

The processor 30 receives electronic data signals from the optical imager 26 that are used to construct the digital image 20. The processor 30 generally includes an analog-to digital (A/D) converter as well as a signal processor and/or preprocessor. The A/D converter converts the electronic data signal to digital signals that can be easily processed by the signal processor prior to being output as the digital image 20 to the computer system 14. In many applications, the digital image 20 is actually constructed within the computer system 14. In these applications, the digital image 20 output to the computer system 14 is an electronic data stream that is used by the computer system 14 to construct the complete digital image 20.

Referring to FIG. 2A, the optical imager 26 includes a visible light source 32, an infrared light source 34, optics 36a and 36b, and a sensor system 38. The visible light source 32 produces visible light 40. i.e., white light, having a broad electromagnetic frequency band. In many applications, the visible light source 32 comprises a flourescent light that varies between low intensity and high intensity. The flourescent light source 32 is generally not turned off as the bulb takes time to warm-up to operating temperatures. The visible light source 32 may also comprise other suitable types of white light sources, such as halogen, LED's, incandescent, direct gas discharge lamps (xenon).

The infrared light source 34 operates a produce infrared light 42. The infrared light source 34 is generally a white light source with a infrared filter that is transmissive to infrared light. In some applications the infrared light source 34 will incorporate a infrared filter with the same light bulb as the visible light source 32. The infrared light source 34 may also comprise other suitable types of light sources, such as an LED, or direct gas discharge lamp.

The visible and infrared light, 40 and 42 respectively, are focused with optics 28a onto the source image 18. The optics 28a may include mirrored surfaces and various lenses for directing the light onto the source image 18. In the case of a transmissive electronic scanner 12, the light passes through the source image 18 and is attenuated by the colors and defects in the source image 18. The light from the source image 18 is then collected and focused by optics 28b onto the sensor system 38. The optics 28b generally include precision focusing lenses for maintaining the spacial orientation of the light from the source image 18. Spacial orientation allows the sensor system 38 to detect the light from discrete locations of the source image 18.

The sensor system 38 generally comprises a trilinear array of sensors 44. As described in greater detail below, the sensor system 38 measures the intensity of light associated with each color of light from the source image 18. As a simple example, assume the color slide of a red kite in a blue sky. The red kit portion of the color slide will allow red light to pass through the slide, but will block substantially all of the blue and green light. The intensity of the red light is measured by the sensor system 38. Accordingly, the sensor system 38 will measure a high red intensity but a low green and blue intensity. Similarly, the blue sky portion of the color slide will allow a substantial portion of the blue light and a small portion of the green light to pass through the slide, but will block substantially all of the green and red light. Accordingly, the sensor system 38 will measure a high blue intensity, a relatively low green intensity, and a low red intensity. The red, green, and blue intensities vary depending upon the color of that portion of the source image 18.

Figure 2B:
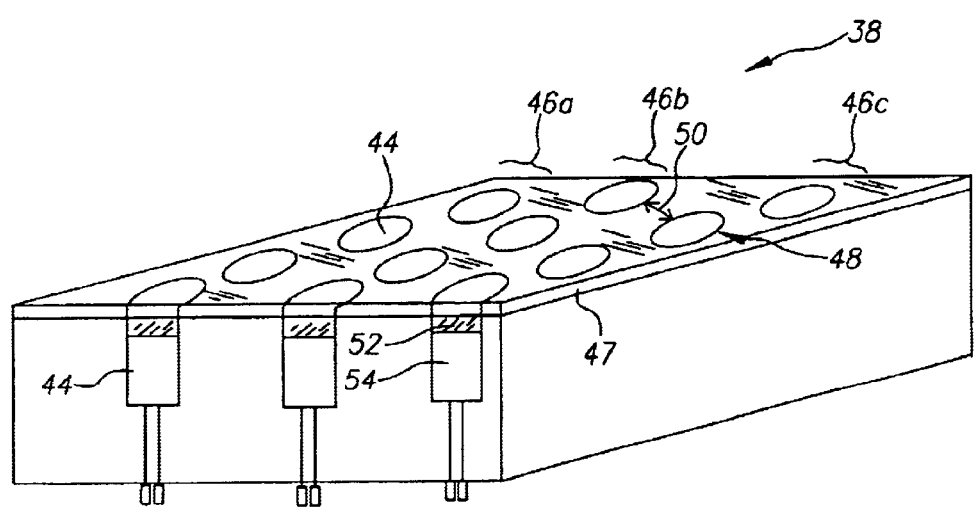

FIG. 2B is a perspective cutaway view of the trilinear sensor system 38 of FIG. 2A. The sensor system 38 comprises a number of sensors 44 arranged in a set of three lines 46a/b/c with a glass cover 47 covering the sensors 44. The horizontal spacing between consecutive lines 46 is known as a pixel pitch 48. A pixel refers both to a position and to the information gathered at that position by the sensor 44. The vertical spacing between sensor lines is known as a sensor line pitch 50 and is typically an integer multiple of the pixel pitch 48. Each line 46 is associated with detecting a different color, such as red, green and blue. One example of a trilinear imager that is currently available is the Sony ILX724K.

Each sensor 44 generally comprises a color filter 52 and a photodetector 54. The color filter 52 is transmissive to a certain color of visible light and also infrared light. For example, the blue line 46a has a blue color filter 52 that allows blue light to pass through the color filter 52. The photodetector 54 measures the intensity of blue light striking the photodetector 54. The photodetector 54 is generally a charge coupled device (CCD). However, other types of photodetectors 54 may be used, such as photoresistors, phototransistors, and the like. The color filter 52 is also transparent to infrared light. Accordingly, the infrared light 42 transmitted through the source image 18 is measured by each of the sensors 44.

Figure 3:
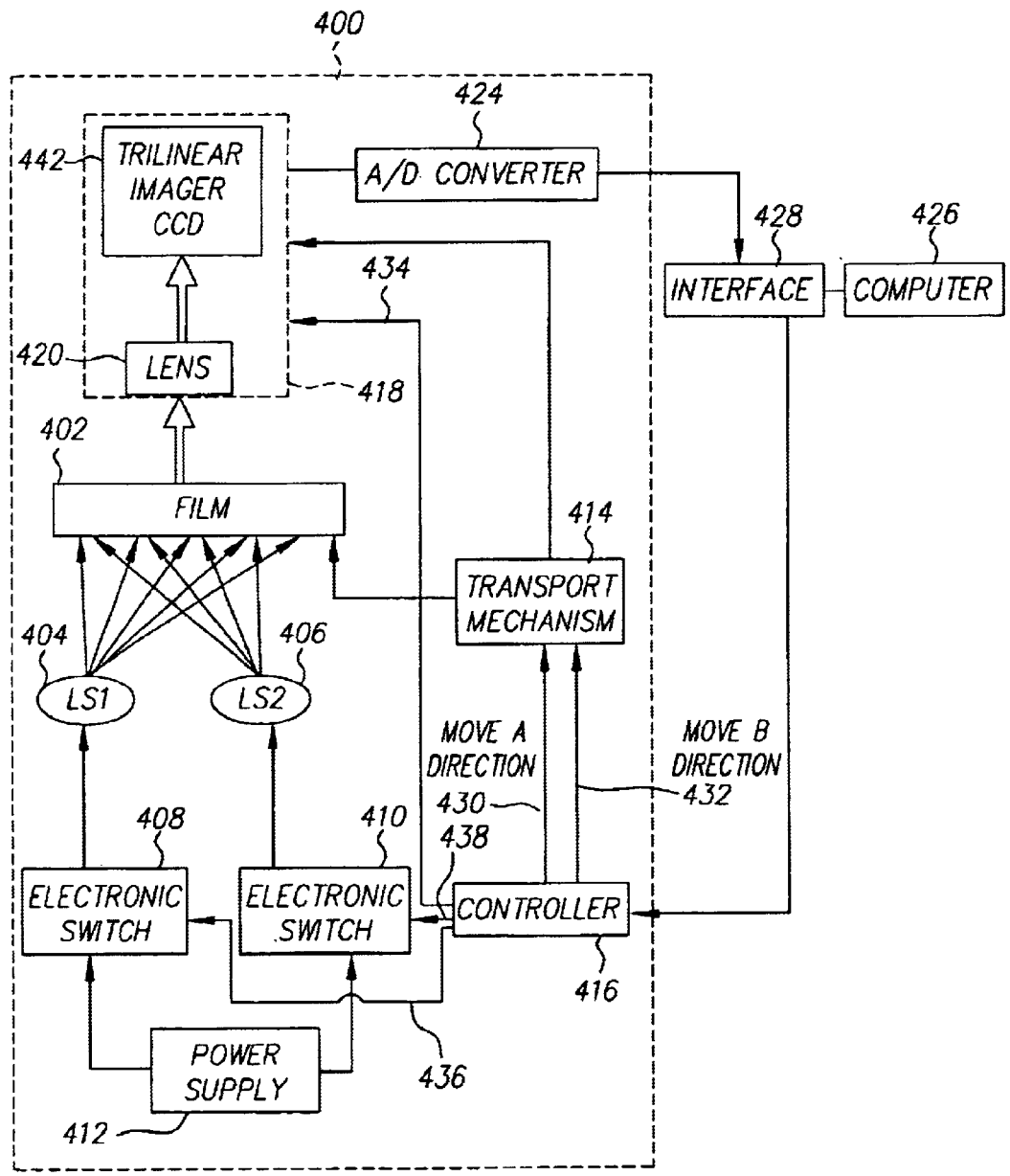
FIG. 3 is a block diagram of a scanner using a trilinear imager for scanning images and capturing defects according to the present invention.

FIG. 3 is a functional block diagram of an embodiment of the present invention for capturing defect data. FIG. 3 illustrates a film scanner 400 that uses a trilinear imager 422 to capture the defect data from a transmissive medium, such as film 402 containing an image thereon.

Scanner 400 includes coupled elements including a first light source (LSI) 404 that produces visible light, and a second light source (LS2) 406 that produces IR light.

Scanner 400 also includes electronic switches 408 and 410, a power supply 412, a transport mechanism 414, a controller 416, a sensor unit 418, and an analog to digital (A/D) converter 424. Sensor unit 418 further includes lens 420 and the trilinear imager charge-coupled device (CCD) 422. Within sensor unit 418, lens 420 focuses light transmitted through film 402 such that the trilinear imager 422 can detect and capture image data.

Images and defects are captured when light generated by first and second light sources 404 and 406 is transmitted through film 402 to the sensor unit 418. Sensor unit 418 outputs the captured image and defect information to an A/D converter 424, which converts to digital image and defect data. The digital data is then transferred through interface 328 to be processed by a computer 326.

First and second light sources 404 and 406 are preferably arranged for separate operation such that, during scanning, light from first light source 404 is used to capture an image (including defects), while the light from the second light source 406 is used to capture the defects on the image. In other words, when light from first (visible) light source 404 illuminates film 402, the light transmitted through film 402 and received by sensor unit 418 will contain image information, including information on any defects that may be present on the surface of film 402. When light from the second (IR) light source 406 illuminates film 402, the light transmitted through film 402 and received by sensor unit 418 will contain information of defects on film 402.

The first light source 404 generates light when power is applied from the power supply 412 via a first electronic switch 408. The second light source 406 generates light when power is applied from the power supply 412 via a second electronic switch 410. Electronic switches 408 and 410, which may include transistors and/or relays, are regulated by the controller 416 via control lines 436 and 438.

In addition to controlling electronic switches 408 and 410, controller 416 is also coupled to transport mechanism 414 via control lines 430 and 432. This allows controller 416 to send signals to transport mechanism 414 to control the positioning to system 400 components during separate operations for capturing image and/or defect information. Controller 416 is further coupled to sensor unit 418 via control line 434. Controller 416 can comprise, for example, a programmable microcontroller such as an MC68HC05 made by Motorola.

Transport mechanism 414 preferably responds to commands from controller 416 by aligning system 400 components for separate operations for capturing image and/or defect information. More specifically, a first alignment will preferably provide for conventional image capturing, and a second alignment will preferably provide for capturing defects, as will be discussed in more detail hereinafter.

Operationally, controller 416 provides control signals for two separate scan cycles. During an "image scan" cycle, image data (including any defects) is captured, and during a separate "defect scan" cycle, defect data is captured. During a one-pass scan, for example, controller 416 preferably sends first alignment control signals 430 to transport mechanism 414 to align sensor unit 418 in a conventional one-pass manner. During a two-pass scan, sensor unit 418 is moved in response to first control signals 430 to a first alignment position. Then, during a defect scan cycle, sensor unit 418 is moved in response to second control signals 432 (a reverse scan cycle order can also be used). Although a one-pass scan is preferred for expediency, multiple scans can also be used.

In addition to controlling the alignment of the system 400 components, the controller 416 can also be used for controlling other components of the present invention. For example, first and second control signals 430 and 432 can be sent in conjunction with first and second control signals 436 and 438 to control electronic switches 408 and 410, respectively. Controller 416 can also send additional control signals (not shown) such that, consistent with conventional image scanning, when light is supplied, a sensor is activated, and sensed light is captured during a given scan cycle. Alternatively, multiple controllers, CPU's, digital signal processors ("DSP's") and/or other data processing components can also be used in accordance with the present invention.

It will be apparent to those skilled in the art that other embodiments of the present invention are also possible. For example, the computer 426 could be replaced with dedicated hardware, and a wide variety of different light source could be used for the first light source 404.

Figure 4:
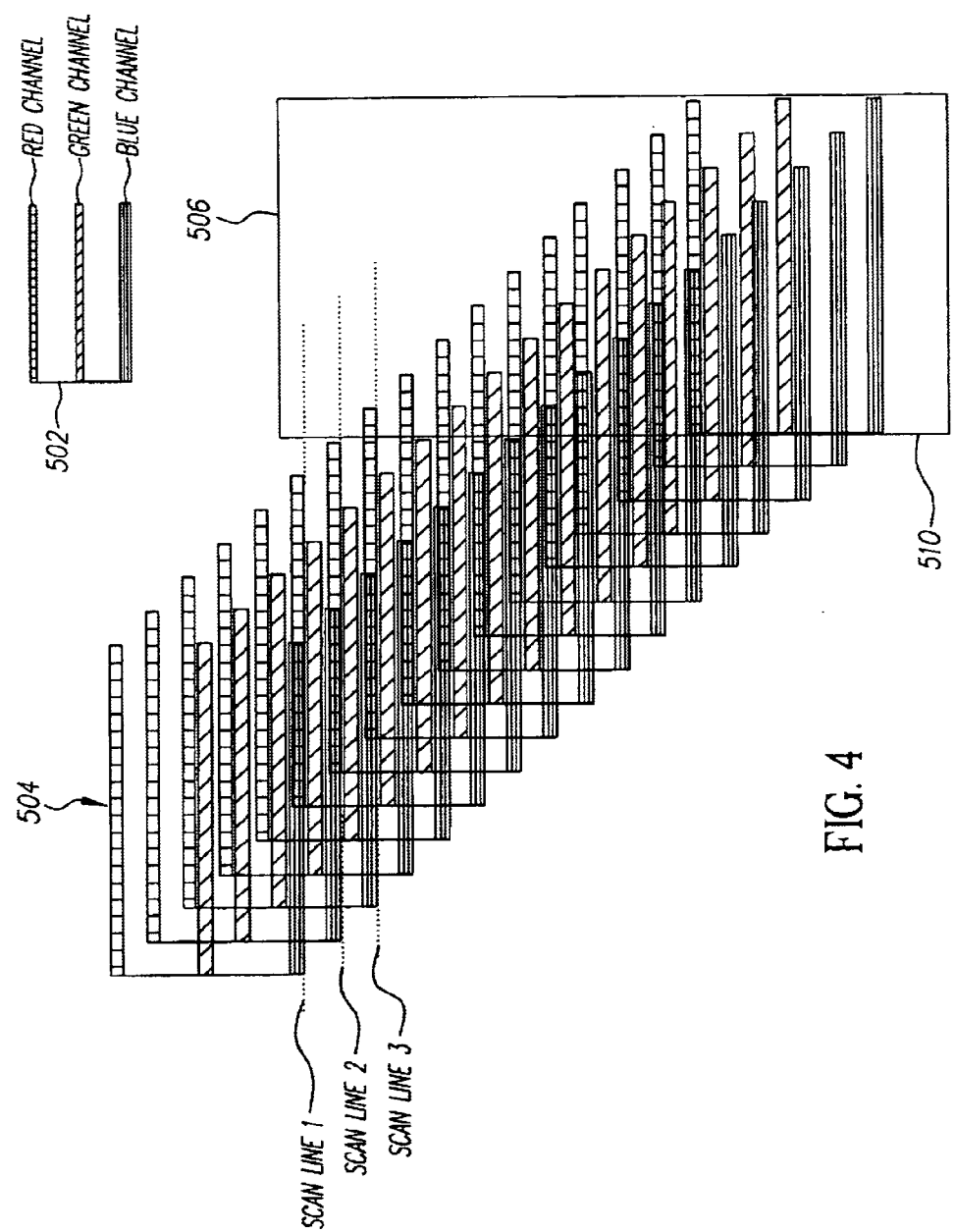
FIG. 4 is a diagram illustrating how a trilinear imager uses a scan pattern with red, green, and blue channels in a series of scan positions to capture information for all three colors for each scan line in an image according to the present invention.

FIG. 4 illustrates how a trilinear imager 422 in FIG. 3 scans an image 506 on a page 510. When the visible light source (LSI) 404 pulses, the trilinear imager 422 gathers information in a scan pattern 502 simultaneously capturing information for three separate scan lines across the image's page through each of the red, green, and blue channels. The imager 422 continues capturing information in a series of scan positions 504 as the visible light source pulses until each scan line of the image has been scanned for all three colors. The imager 422 gathers the scanned information for the image starting at the first scan line (scan line 1). The scanner loads the image starting from scan line 1 because the first line of pixels covers all three color channels. Thereafter, each subsequent line, such as scan line 2 and scan line 3, are loaded into the scanner. In the example provided above, it is assumed that the line spacing between each color channel of the scan pattern 502 is 4 lines. In other words, when the red channel is positioned on line 1, the corresponding green and blue channels are positioned on lines 5 and 9, respectively.

Figure 5:
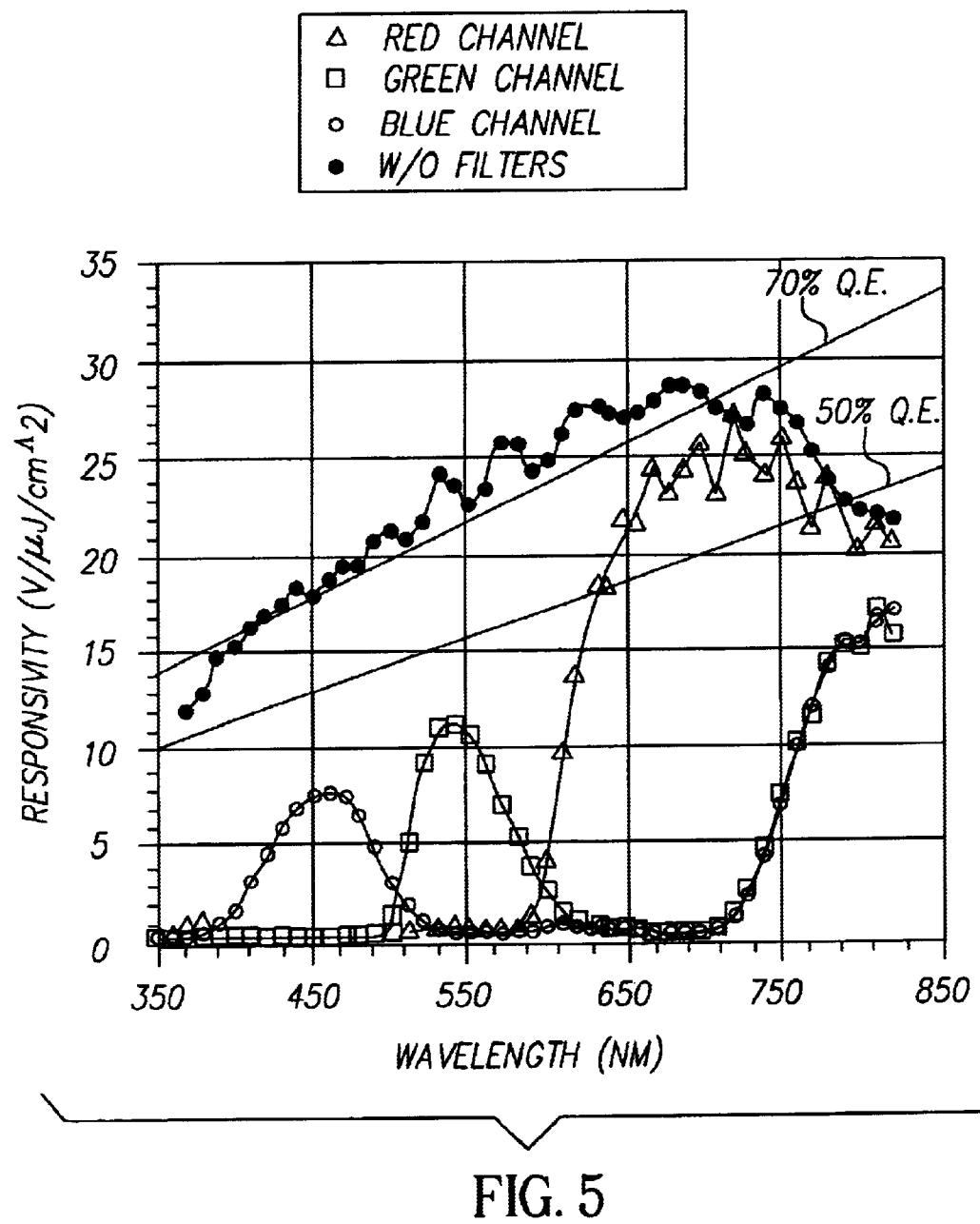
FIG. 5 is a graph showing the spectral response of each filter in a trilinear imager according to the present invention.

FIG. 5 is a graph showing the spectral response of each filter in a trilinear imager according to the present invention. As shown, the spectral response (y-axis) of each filter in the trilinear imager reaches a peak at a wavelength (x-axis) that is associated with a particular color. Each filter is also capable of blocking out wavelengths associated with certain colors. In addition, each filter used in the present invention is capable of responding to wavelengths associated with IR light. Therefore, the present invention can use multiple color-filter channels to capture defect information in response to IR light.

Figure 6:
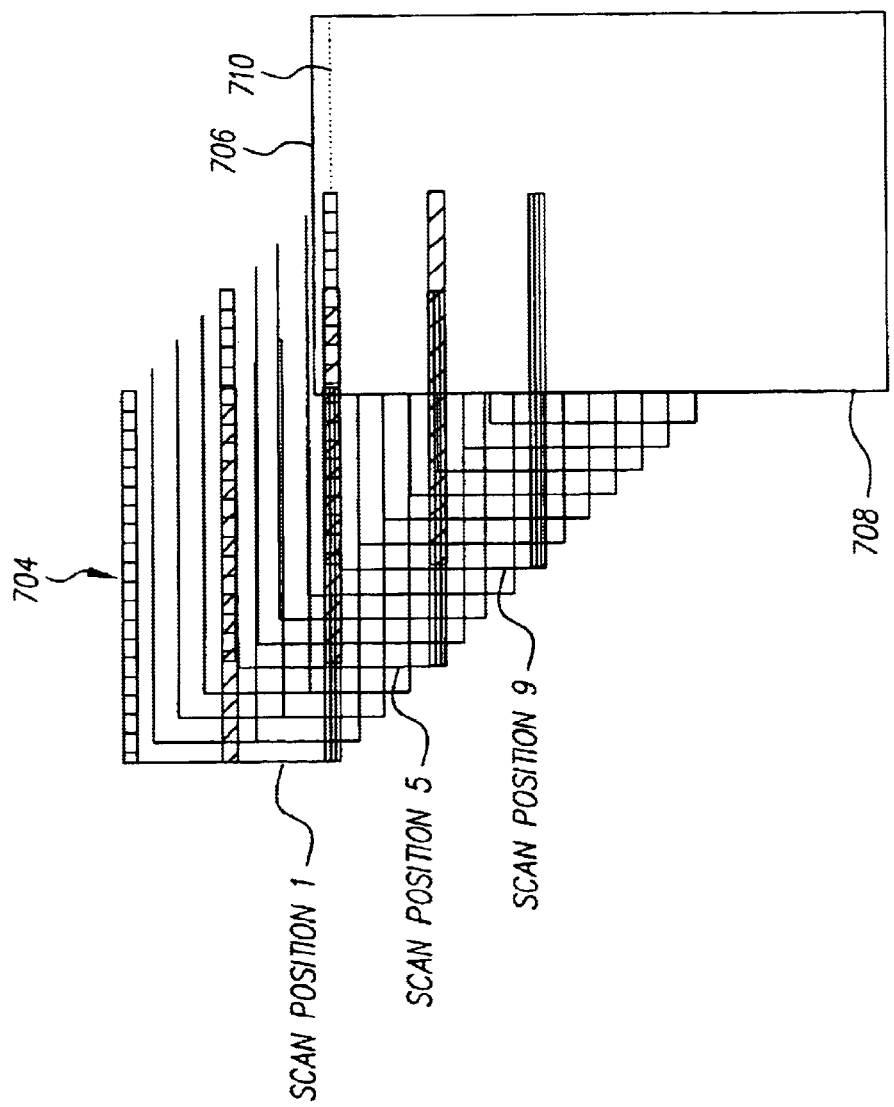
FIG. 6 is a diagram illustrating how a trilinear imager uses three different scan positions to capture the three colors for one scan line according to the present invention.

FIG. 6 illustrates how the trilinear imager 422 in FIG. 3 uses three different scan positions to capture information of all three colors for one scan line 710, i.e. scan line 1, of an image 706 on a page 708, according to the preferred method of the present invention. For scan line 710, the information from blue channel is captured during the first scan position (position 1), the information from the green channel is captured during the fifth scan position (position 5), and the information from the red channel is captured during the ninth scan position (position 9). Thus, information for all three color channels are captured at different scan positions.

In the first embodiment of the present invention, a method for collecting IR information through at least one color channel for each scan line is disclosed. In this embodiment, defect data can be collected at every third scan position to capture information about every scan line. Using this method, the IR gathering time is at least three times faster than using a conventional scanner having only one color channel for detecting IR information. Preferably, the present method can be implemented with a scanner having components (hardware and settings) such that the sensor line pitch is not a factor of three times the scan line pitch.

The first embodiment of the present invention can be implemented with either a one-pass system or a two-pass system. In the one-pass system, the visible light source pulses during the first scan position, and the trilinear imager simultaneously captures three separate scan lines of image information across the image's page, one line for the red, green, and blue channels. Then, before moving the scanner to the second scan position, the IR light source pulses through all three color channels, thus allowing the trilinear imager to capture three separate scan lines of defect information across the page. When the scanner is in the second scan position, only the visible light is allowed to pulse, and the trilinear imager captures only the image information for three separate scan lines. At the third scan, again only the visible light is allowed to pulse and only image information is captured. The fourth scan position is similar to the first scan position where the visible light and IR light sources are pulsed in the order set forth above, and both image and defect information is captured. At the fifth and sixth scan positions, only image information is captured. At the seventh position, both image and defect information is captured. The process continues, pulsing the visible light for each scan position and further pulsing the IR light every third scan position, until all scan positions for the image have been captured.

FIG. 7 is a table illustrating scan positions that record IR information for different color channels for each scan line in accordance with the present invention. By using all three color channels to capture IR information, the scanner only needs to pulse the IR light at every third scan position, for example at scan positions 1, 4, 7, 10, 13, 16, and so on, to capture every scan line in an image. For example, for the first scan line, the trilinear imager records the IR information through the blue channel at the first scan position. For the second scan line, it records the IR information through the red channel at the tenth scan position. For the third line, it records the IR information through the green channel at the seventh scan position, and so on. At each of these scan positions (1, 4, 7, 10, 13, 16, etc), the trilinear imager simultaneously records the IR information through all three color channels. At the tenth scan position, for example, it records through the red channel for scan line 2, through the green channel for line 6, and through the blue channel for line 10.

Next, in a two-pass system of the first embodiment of the present invention, a visible light source is used to record color information for all the scan lines of the image during the first pass. Then an IR light source is used to capture defects during a second pass of the image while scanning the image either forward or backward. In the second pass, the system moves directly to every third scan position in the series and captures defect data, until all the scan lines for the image are covered. For example, the system moves to the first scan position, the fourth, the seventh, and so on. As in the one-pass system of the first embodiment, the trilinear imager records the IR information through all three color channels simultaneously to eventually gather correct information from every scan line in the image. But, unlike the one-pass system where the IR information is gathered when the IR light source pulses every third scan position during the first pass, the two-pass system captures the IR information every third scan position only during the second pass.

Figure 8:
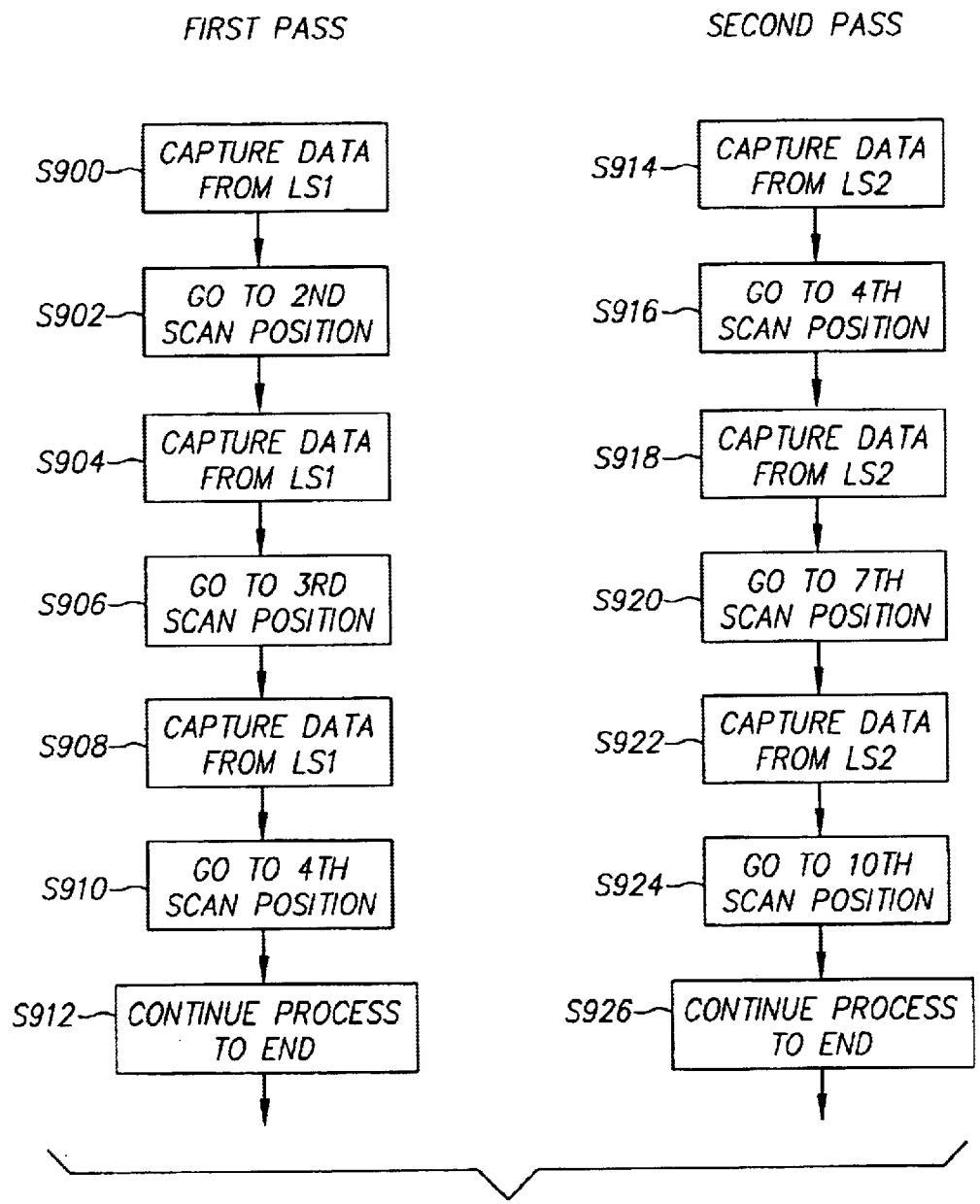
FIG. 8 is a flow chart for a two-pass system according to an embodiment of the present invention.

In more detail, FIG. 8 illustrates a flow chart of a two-pass system in accordance with the first embodiment of the present invention. The scanner pulses a visible light for the first scan position in S900, and the trilinear imager records image information. Then the scanner moves to the second scan position in S902, and so on until it captures the color for the entire image. On the second pass, scanning forward, the scanner pulses an IR light for the first scan position in S914, and the trilinear imager records defect information through all three color channels. Then the scanner moves to the fourth scan position in S916, and the trilinear imager records defect data. This process continues at every third position, at the $7^{th}$, $10^{th}$, $13^{th}$, $16^{th}$, and so on. Alternately, the second pass could scan backward at every third scan position.

An alternate method of the first embodiment is to use each color channel simultaneously to record IR information at every scan position, but reducing the gathering time by one third at each scan position. Thus, the gathering time is three times faster than if the scanning was performed at every scan position using the full gathering time. Since this alternative method employs three channels to simultaneously gather IR information, it gathers the same amount of defect information as the system using the full gathering time. After the IR information has been recorded from all three channels, this method systematically adds together the recorded values to accurately reflect and identify defects.

Another method of the first embodiment, also not restricted by the sensor line pitch, is to alternatively turn on the visible light and the IR light at every nth scan line, where n is the number of scan lines that fit into one sensor light pitch. For the next 2n scan lines, the scanner only turns on the visible light, and this pattern is repeated for the remainder of the page. For example, if the pixel pitch is 800 dpi (1/800 inch) and the sensor line pitch is 8 pixels (8/800 inch) and the scanner is scanning at 400 dpi (1/400 inch), then n is equal to 4 (8/800 divided by 1/400). In this example, the scanner would alternate turning on the visible light and the IR light for the next 4 scan lines. For the next 8 scan lines, the scanner would turn on only the visible light. For the next 4 scan lines thereafter, the visible and IR lights would alternate. For the next 8 scan lines, the scanner would again turn on only the visible light. The same process would continue until the end of the page.

A second embodiment of the present invention uses each RGB color channel simultaneously in a multilinear-imager to collect IR information from every scan line. Since this embodiment collects IR information from all three channels for every scan line, three times as much defect information is captured. The additional information available from these three samples can be used to increase the clarity of the captured defect image since it improves the signal/noise ratio.

In a one-pass system in accordance with the second embodiment, the scanner pulses a visible light source for the first scan position, and the trilinear imager captures image information. Then the scanner pulses an IR light source in the first scan position, and the trilinear imager captures defect information. The scanner then moves on to the second scan position and again pulses the visible light source to capture image information and then pulses IR light source to capture defect information. This process continues until all scan positions for the image have been recorded.

In a two-pass system in accordance with the second embodiment, the scanner pulses a visible light source to record image information at each scan position until the entire image is covered. Then the scanner makes a second pass over the image, scanning information.

Once the present invention has captured defect information, users can employ a wide variety of methods to remove the defects from the scanned image, as is known by those skilled in the art.

Although the present invention has been described in several embodiments, various changes and modifications may be suggested to one skilled in the art. It is intended that the present invention encompass such changes and modifications that fall within the scope of the appended claims.

What is claimed is:

1. A method for capturing image and defect information from an image scanned from a medium, comprising the steps of:

capturing image and defect information by a sensor unit during every scan position while transmitting visible light from a first light source through the medium; and capturing defect information by the sensor unit during every third scan position while transmitting infrared light from a second light source through the medium.

2. A method according to claim 1, further comprising the steps of:

aligning the sensor unit and/or the medium in a first alignment during transmission of visible light; and aligning the sensor and/or the medium in a second alignment during transmission of infrared light.

3. A method according to claim 1, wherein visible light and infrared light are not transmitted simultaneously through the medium.

4. A method according to claim 1, wherein the medium comprises one of a film, a document, and a photograph.

5. A method according to claim 1, wherein the steps of transmitting visible light and infrared light through the medium occur during a first pass.

6. A method according to claim 1, wherein the step of transmitting visible light occurs during a first pass and the step of transmitting infrared light occurs during a second pass.

7. A method according to claim 1, wherein every scan position comprises three separate scan lines, each scan line associated with either a red, green, and blue channel of the sensor unit.

8. A method for capturing image and defect information from an image scanned from a medium, comprising the step of:

(1) alternatively transmitting visible light and infrared light through the medium for each scan line up to n lines in conjunction with capturing image and defect information during visible light transmission and capturing defect information during infrared light transmission;

(2) transmitting only visible light through the medium at each scan line for the next 2n scan lines in conjunction with capturing image information during visible light transmission after performing step (1); and (3) repeating steps (1) and (2) until all image and defect information is captured for the medium.

9. A method according to claim 8, wherein n equals a pixel pitch multiplied by a sensor line pitch divided by a scanning rate.

10. A method for capturing image and defect information from an image scanned from a medium, comprising the steps of:

transmitting visible light from a first light source through the medium to capture image and defect information by a sensor unit during every scan position with the sensor unit and/or the medium in a first alignment; and transmitting infrared light from a second light source through the medium to capture defect information by the sensor unit during every scan position after moving the sensor and/or the medium to a second alignment different than the first alignment.

11. A method according to claim 10, wherein visible light is transmitted through the medium before the infrared light is transmitted.

12. A method according to claim 10, wherein the medium comprises one of a film, a document, and a photograph.

13. A method according to claim 10, wherein the steps of transmitting visible light and infrared light through the medium occur during a first pass.

14. A method according to claim 10, wherein the step of transmitting visible light occurs during a first pass and the step of transmitting infrared light occurs during a second pass.

15. A method according to claim 10, wherein every scan position comprises three separate scan lines, each scan line associated with either a red, green, and blue channel of the sensor unit.

16. A scanner used for capturing image and defect data from a surface of a medium containing an image thereon, comprising:
   a first light source and a second light source;
   a first switch coupled to the first light source and a second switch coupled to the second light source;
   a power supply coupled to the first and second light switches;
   a sensor unit having a multi-linear imager and optical lens, the optical lens adapted to focus light transmitted through the surface of the medium to the multi-linear imager, thereby capturing image and defect information;
   an analog to digital converter adapted to convert the image and defect information to digital image and defect data;
   a transport mechanism adapted to align the sensor unit and/or the medium for capturing the image and defect information, wherein the transport mechanism is configured for aligning the sensor unit and/or the medium in a first alignment for capturing image information and for moving the sensor unit and/or the medium to a second alignment different than the first alignment for capturing defect information; and
   a controller adapted to control the first switch, the second switch, the transport mechanism, and the sensor unit.

17. An apparatus according to claim 16, wherein the first light source generates visible light, and the second light source generates infrared light.

18. An apparatus according to claim 16, wherein the first light source is used to capture image and defect information and the second light source is used to capture defect information.

19. An apparatus according to claim 16, wherein the first light source and the second light source do not generate light simultaneously.

20. An apparatus according to claim 16, wherein the medium comprises one of a film, a document, and a photograph.

21. A method of digitizing a source image, comprising:
   collecting visible light data and infrared light data simultaneously on at least two color sensor channels at a first increment of scan positions; and
   collecting visible light data during a second increment of scan positions greater than the first increment of scan positions on at least one of said color sensor channels.

* * * * *